United States Patent Office 3,267,271
Patented August 16, 1966

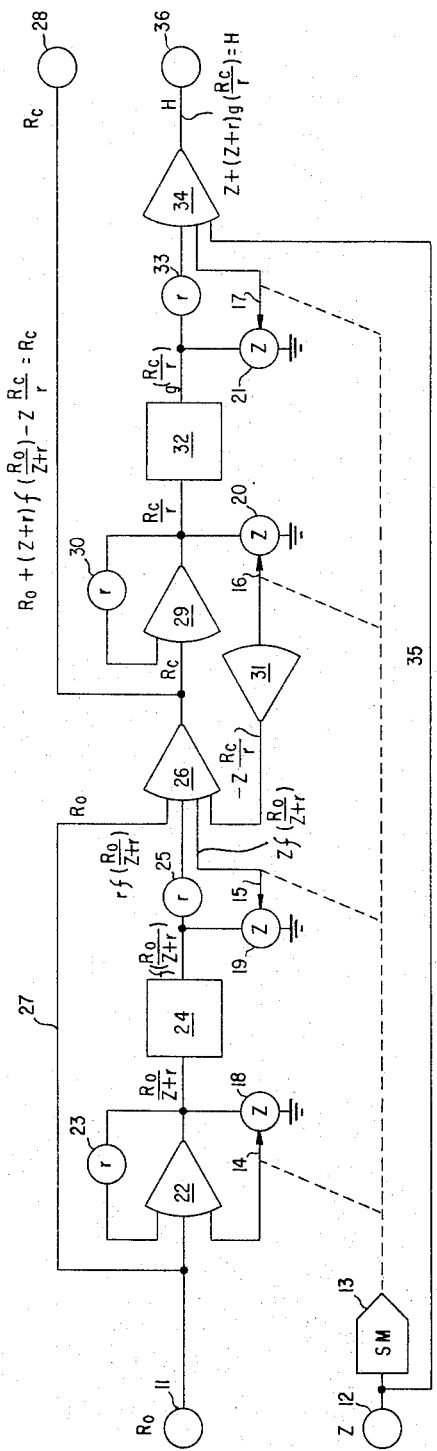

3,267,271
APPARATUS FOR THE ANALOG COMPUTATION OF EARTH CURVATURE CORRECTION
William K. Kindle and Thomas Z. Smidowicz, West Long Branch, N.J., assignors to Electronic Associates Inc., Long Branch, N.J., a corporation of New Jersey
Filed Jan. 16, 1963, Ser. No. 251,968
3 Claims. (Cl. 235—193)

This invention relates in general to a method and apparatus for performing analog computation and more particularly to a novel method and apparatus for computing the true height and horizontal range of a radar sensed target object above the earth's surface, corrected for any errors attributable to the curvature of the earth.

As radar technology has advanced over the years, especially in keeping pace with the present day requirements of long range missile, high altitude manned aircraft, and space satellite detection and tracking, the maximum ranges at which radar equipments are effectively operable has correspondingly increased. When Cartesian target coordinates (horizontal range and height) are supplied by a long range radar for a target object several hundred miles or more distant travelling above the earth's surface, earth curvature corrections must be provided in order to achieve the required degree of accuracy. When dealing with shorter radar ranges, the conventional manner of obtaining such corrections has been to employ geometrical series expansions, utilizing only the first several terms of the expansions as a close approximation in arriving at the true coordinates. While this technique has proved to be satisfactory for short range targets, its extension to long range targets requires the utilization of additional terms of the expansions which becomes not only awkward but wholly impractical in terms of both design and apparatus requirements. As an illustrative example of the shortcomings of the expansion method, for an angle $\theta$ at the center of the earth between a ground based radar and a target object of 55 degrees, a radar with a maximum range of 10,000,000 yards employing two correction terms of the expansion in height plus three correction terms of the expansion in range will produce 4 percent errors in corrected height and 1 percent errors in corrected range. Two additional correction terms in each expansion are required to reduce these errors to slightly greater than 0.1 percent.

One suitable technique for applying exact earth curvature corrections to radar supplied Cartesian target coordinates involves analog computation and is described in the copending patent application of T. Z. Smidowicz, Serial No. 251,967, which has the same assignee as this application. While the technique described therein is wholly satisfactory for a target object which is at a relatively long range with respect to the ground-based radar which senses it, the analog implementation involved requires the use of trigonometrically wound potentiometers whose wiper arms are automatically positioned in accordance with the value of the previously defined angle $\theta$. When this angle is comparatively small, as when dealing with short range target objects, the degree of accuracy attainable is seriously impaired owing to the difficulty of deriving precise trigonometric values from the potentiometers. This problem may be more readily appreciated by considering that whereas the cosine of an angle changes from a value of 1.000 to 0.000 as the angle increases from 0 to 90 degrees, the cosine changes from 1.000 to only .8660 as the angle increases from 0 to 30 degrees. This small change in the cosine value over the angular span from 0 to 30 degrees is very difficult to accurately implement on a trigonometrically wound potentiometer, and as a consequence unavoidable errors are generated when the target object is at a relatively short range with respect to the radar.

It is accordingly an object of this invention to provide a novel apparatus for computing the true height and horizontal range of a radar sensed target object above the earth's surface, corrected for the curvature of the earth.

It is a further object of this invention to provide such an apparatus which is capable of supplying earth curvature corrected coordinates of this type with greater accuracy and which requires less implementing equipment than previously employed techniques.

It is a further object of this invention to provide a novel D.-C. analog computer employing conventional components, which, when supplied with the uncorrected horizontal range and height coordinates of a target object by a ground-based radar, will quickly and accurately apply true earth curvature corrections thereto and provide such corrected coordinates at its output terminals.

It is a further object of this invention to provide such a D.-C. analog computer which is equally accurate for both long and short range target objects and which does not employ any trigonometrically wound potentiometers.

These and further objects of this invention will be readily apparent to those skilled in the art from a consideration of the following description of the best embodiment thereof yet contemplated, taken in conjunction with the drawings in which:

FIGURE 1 is a geometrical diagram which will be used for purposes of illustration showing the locations of the center of the earth, a ground-based radar, and a target object above the earth's surface, and identifying certain essential linear and angular dimensions, and FIGURE 2 is a schematic diagram of a novel analog computer circuit which is capable of providing exact earth curvature corrected horizontal range and height coordinates of a target object above the earth's surface as sensed by a ground-based radar.

Referring now to FIGURE 1, a radar station positioned on the earth's surface as shown transmits a series of spaced pulse signals from a directional antenna which are reflected off of or bounced back from a target object above the earth's surface. The reflected pulse signals are detected and received by the radar antenna and the slant range $Rs$ and the elevation angle $\alpha$ are obtained. The slant range $Rs$ is derived from the elapsed time between the transmission, reflection, and receipt of a given pulse, and the elevation angle $\alpha$ is obtained from the angular position of the directional radar antenna. A conventional polar-to-Cartesian coordinate computer supplies the uncorrected horizontal range $Ro$ and height $Z$, which are trigonometrically derived from $Rs$ and $\alpha$ in accordance with the following equations:

$$Z = Rs \sin \alpha \quad (1)$$

and $$Ro = Rs \cos \alpha \quad (2)$$

These two quantities $Ro$ and $Z$, along with the known radius of the earth $r$, serve as the basic data inputs to the earth curvature correction analog computer shown in FIGURE 2.

For the derivation of the expressions for the corrected horizontal range $Rc$ and the corrected height $H$, and the computational implementation thereof, reference is again made to FIGURES 1 and 2, from which it can be seen that, for $\theta$ small, $$\theta = \tan^{-1} \frac{Ro}{Z+r} = \frac{Rc}{r} \quad (3)$$

Solving for $Rc$ in Equation 3, we have, $$Rc = r \tan^{-1} \frac{Ro}{Z+r} \quad (4)$$

If we now establish a function $f$ of $$\frac{Ro}{Z+r}$$

as being defined by the expression, $$f=\left(\frac{Ro}{Z+r}\right)=\tan^{-1}\frac{Ro}{Z+r}-\frac{Ro}{Z+r} \quad (5)$$

then transposing yields, $$\tan^{-1}\frac{Ro}{Z+r}=\frac{Ro}{Z+r}+f\left(\frac{Ro}{Z+r}\right) \quad (6)$$

Substituting Equation 6 in Equation 4 gives us, $$Rc=\frac{rRo}{Z+r}+rf\left(\frac{Ro}{Z+r}\right) \quad (7)$$

and multiplying through in Equation 7 by $(Z+r)$ yields, $$(Z+r)Rc=rRo+r(Z+r)f\left(\frac{Ro}{Z+r}\right) \quad (8)$$

If we now factor and transpose Equation 8 we have, $$Rc-Ro=(Z+r)f\left(\frac{Ro}{Z+r}\right)-Z\frac{Rc}{r} \quad (9)$$

which, after solving for $Rc$ gives us, $$Rc=Ro+(Z+r)f\left(\frac{Ro}{Z+r}\right)-Z\frac{Rc}{r} \quad (10)$$

Equation 10 is an exact expression for the earth curvature corrected horizontal range $Rc$ of the target object, as shown in FIGURE 1.

For the analog implementation of Equation 10 reference is made to FIGURE 2, from which it can be seen that D.-C. voltages representing the uncorrected horizontal range $Ro$ and height $Z$ of the target object, as derived from the radar apparatus, are applied to input terminals 11 and 12, respectively. A precision servo-multiplier 13 is connected to input terminal 12 and positions the ganged wiper arms 14, 15, 16, and 17 of linear potentiometers 18, 19, 20, and 21, respectively, in proportion to the value of the uncorrected height $Z$.

Servo-multiplier 13, potentiometers 18-21, and the rest of the circuit components shown schematically in FIGURE 2, including the operational amplifiers and the function generators, may take any one of several acceptable forms, all of which are well known and conventional in the analog computing art. Since the specific form of these components is outside the scope of the present invention, they will not be described in detail. For a more precise explanation of the design and functioning of these components, reference is made to the authoritative textbook on the subject entitled, "Electronic Analog Computers" by Granino A. Korn and Theresa M. Korn, published in 1956 by the McGraw-Hill Book Company, Inc., Library of Congress catalog card number 56-8176.

The input voltage representing the value of $Ro$ is supplied to a divisional operational amplifier 22 along with attenuation proportional to the value of $Z$, as obtained from the servo-positioned wiper arm 14 of linear potentiometer 18, and $r$, as obtained from a fixed resistance 23, whose value is fixed in accordance with the known radius of the earth $r$. Operational amplifier 22 provides an output voltage proportional to the quantity $$\frac{Ro}{Z+r}$$

which is supplied to the input of precision function generator 24. This component may be in the form of a diode lattice network, for example, and generates an output voltage $$f\left(\frac{Ro}{Z+r}\right) \text{ equal to } \tan^{-1}\frac{Ro}{Z+r}-\frac{Ro}{Z+r}$$

as defined by Equation 5. The output voltage from function generator 24 is multiplied by $r$ by applying it across fixed resistor 25, and by $Z$ by applying it across linear potentiometer 19. The voltages representing the products $$rf\left(\frac{Ro}{Z+r}\right)$$

obtained from resistor 25, and $$Zf\left(\frac{Ro}{Z+r}\right)$$

obtained from the servo-positioned wiper arm 15 of potentiometer 19, are supplied as first and second inputs to a summing operational amplifier 26. A voltage representing the input quantity $Ro$ is also supplied as a third input to operational amplifier 26 directly over the by-pass line 27. The fourth input to operational amplifier 26 is a voltage representing the quantity $$-Z\frac{Rc}{r}$$

which is obtained from a feedback loop as will be described later. These four input voltages, which will be recognized as representing all of the terms on the right hand side of Equation 10, are additively combined in operational amplifier 26 to produce an output voltage at terminal 28 which is equal to the desired earth curvature corrected horizontal range $Rc$ of the target object as defined by previously derived Equation 10.

Thus, by means of the novel analog implementation of several relatively uncomplicated and straightforward geometric and trigonometric derivations, an output voltage may be obtained from the apparatus of FIGURE 2 which represents the exact horizontal radar range of a target object accurately corrected for the curvature of the earth's surface.

Referring once again to FIGURE 1, the expression for the earth curvature corrected height $H$ is derived by first recognizing that, $$\cos\theta=\frac{Z+r}{H+r}=\cos\frac{Rc}{r} \quad (11)$$

Multiplying Equation 11 by $H+r$ and then cross multiplying yields, $$H+r=\frac{Z+r}{\cos Rc/r}=(Z+r)\sec\frac{Rc}{r} \quad (12)$$

Transposing $r$ to solve for $H$ gives, $$H=(Z+r)\sec\frac{Rc}{r}-r \quad (13)$$

If we now establish a function $g$ of $$\frac{Rc}{r}$$

as being defined by the expression, $$g\left(\frac{Rc}{r}\right)=\sec\frac{Rc}{r}-1 \quad (14)$$

then transporting the 1 yields, $$\sec\frac{Rc}{r}=1+g\left(\frac{Rc}{r}\right) \quad (15)$$

Substituting Equation 15 in Equation 13 now gives us, $$H=(Z+r)\left[1+g\left(\frac{Rc}{r}\right)\right]-r \quad (16)$$

which may be simplified by cancelling and factoring to, $$H=Z\left[1+g\left(\frac{Rc}{r}\right)\right]+rg\left(\frac{Rc}{r}\right) \quad (17)$$

or, $$H=Z+(Z+r)g\left(\frac{Rc}{r}\right) \quad (18)$$

Equation 18 is an exact expression for the earth curvature corrected height $H$ of the target object as shown in FIGURE 1.

For the analog implementation of Equation 18, reference is again made to FIGURE 2. The output voltage of operational amplifier 26 representing $Rc$ is supplied to a divisional operational amplifier 29 along with a voltage representing the known radius of the earth $r$, which is taken from a fixed resistance 30.

Turning for the moment to a more complete description of the feedback loop mentioned earlier, the output voltage of operational amplifier 29, representing the quotient $$\frac{Rc}{r}$$

is applied across linear potentiometer 20. The voltage taken from the servo-positioned wiper arm 16 of potentiometer 20 then represents the product $$Z\frac{Rc}{r}$$

the polarity of which is reversed by operational amplifier 31. The output voltage of operational amplifier 31, representing the quantity $$-Z\frac{Rc}{r}$$

which is recognized as being the last term in the right hand side of Equation 10, is then supplied in feedback fashion as the fourth input to the summing operational amplifier 26 to provide for a continuing solution for the corrected horizontal range $Rc$.

The output voltage of operational amplifier 29, representing the quotient $$\frac{Rc}{r}$$

is also supplied to the input of a precision function generator 32, which may be comprised of a lattice network of diodes similar to function generator 24, and which generates an output voltage $$g\left(\frac{Rc}{r}\right) \text{ equal to } \sec\frac{Rc}{r}-1$$

as defined by Equation 14. The output voltage from function generator 32 is multiplied by $r$ by applying it across fixed resistor 33, and by $Z$ by applying it across linear potentiometer 21. The voltages representing the products $$rg\left(\frac{Rc}{r}\right)$$

obtained from resistor 33, and $$Zg\left(\frac{Rc}{r}\right)$$

obtained from the servo-positioned wiper arm 17 of potentiometer 21, are supplied as first and second inputs to a summing operational amplifier 34. A voltage representing the input quantity $Z$ is also supplied directly as a third input to operational amplifier 34 over the by-pass line 35. These three input voltages, which will be recognized as representing all of the terms on the right hand side of Equation 18, are additively combined in operational amplifier 34 to produce an output voltage at terminal 36 which is equal to the desired earth curvature corrected height $H$ of the target object as defined by previously derived Equation 18.

Thus, a novel apparatus for analog computation has been described which may be advantageously used to determine the earth curvature corrected horizontal range and height of a target object above the earth's surface as sensed by a ground-based radar. The apparatus is characterized by its relative structural simplicity and produces highly accurate results when supplied with reliable input data, which is readily available from conventional radar equipment.

While there has been described above a particular embodiment of the present invention, various minor modifications and changes therein will be apparent to those skilled in the analog computer art. Since the disclosed embodiment is intended to be illustrative only and not in any way limiting, such modifications and changes are deemed to be within the spirit and scope of the present invention, which is limited only as defined in the following claims.

We claim:
1. An apparatus for computing the earth curvature corrected horizontal range $Rc$ and height $H$ of a target object above the earth's surface as sensed by a ground-based radar which supplies the uncorrected horizontal range $Ro$ and height $Z$ of the target object, assuming the radius of the earth $r$ to be known, comprising:

(a) means for adding the quantities $Z$ and $r$,
(b) means for dividing the quantity $Ro$ by the quantity $(Z+r)$ obtained from the adding means recited in sub-paragraph (a),
(c) means connected to the dividing means recited in sub-paragraph (b) for generating a function $$f\left(\frac{Ro}{Z+r}\right)$$

in accordance with the expression $$f\left(\frac{Ro}{Z+r}\right) = \tan^{-1}\frac{Ro}{Z+r} - \frac{Ro}{Z+r}$$

(d) means for multiplying the quantity $r$ by the function $$f\left(\frac{Ro}{Z+r}\right)$$

obtained from the generating means recited in sub-paragraph (c),
(e) means for multiplying the quantity $Z$ by the function $$f\left(\frac{Ro}{Z+r}\right)$$

obtained from the generating means recited in sub-paragraph (c),
(f) means for multiplying the quantity $Z$ by the quantity $$\frac{Rc}{r}$$

(g) means for adding the quantities $Ro$, $$Zf\left(\frac{Ro}{Z+r}\right)$$

and $$rf\left(\frac{Ro}{Z+r}\right)$$

(h) means for subtracting the quantity $$\frac{ZRc}{r}$$

from the sum obtained from the adding means recited in sub-paragraph (g) to obtain the earth curvature corrected horizontal range $Rc$ in accordance with the expression $$Rc = Ro + (Z+r)f\left(\frac{Ro}{Z+r}\right) - \frac{ZRc}{r}$$

(i) means for dividing the quantity $Rc$ by the quantity $r$,
(j) means for supplying the quantity $$\frac{Rc}{r}$$

obtained from the dividing means recited in sub-paragraph (i) to the multiplying means recited in sub-paragraph (f) as a feedback quantity,
(k) means connected to the dividing means recited in sub-paragraph (i) for generating a function $$g\left(\frac{Rc}{r}\right)$$

in accordance with the expression $$g\left(\frac{Rc}{r}\right) = \sec\frac{Rc}{r} - 1$$

(l) means for multiplying the quantity $r$ by the function $$g\left(\frac{Rc}{r}\right)$$

obtained from the generating means recited in sub-paragraph (k),
(m) means for multiplying the quantity Z by the function $$g\left(\frac{Rc}{r}\right)$$

obtained from the generating means recited in sub-paragraph (k), and
(n) means for adding the quantities Z, $$rg\left(\frac{Rc}{r}\right)$$

and $$Zg\left(\frac{Rc}{r}\right)$$

to obtain the earth curvature corrected height H in accordance with the expression $$H = Z + (Z+r)g\left(\frac{Rc}{r}\right)$$

2. An apparatus for computing the earth curvature corrected horizontal range Rc of a target object above the earth's surface as sensed by a ground-based radar which supplies the uncorrected horizontal range Ro and height Z of the target object, assuming the radius of the earth $r$ to be known, comprising:
(a) means for adding the quantities Z and $r$,
(b) means for dividing the quantity Ro by the quantity (Z+r) obtained from the adding means recited in sub-paragraph (a),
(c) means connected to the dividing means recited in sub-paragraph (b) for generating a function $$f\left(\frac{Ro}{Z+r}\right)$$

in accordance with the expression $$f\left(\frac{Ro}{Z+r}\right) = \tan^{-1}\frac{Ro}{Z+r} - \frac{Ro}{Z+r}$$

(d) means for multiplying the quantity $r$ by the function $$f\left(\frac{Ro}{Z+r}\right)$$

obtained from the generating means recited in sub-paragraph (c),
(e) means for multiplying the quantity Z by the function $$f\left(\frac{Ro}{Z+r}\right)$$

obtained from the generating means recited in sub-paragraph (c),
(f) means for multiplying the quantity Z by the quantity $$\frac{Rc}{r}$$

(g) means for adding the quantities Ro, $$Zf\left(\frac{Ro}{Z+r}\right)$$

and $$rf\left(\frac{Ro}{Z+r}\right)$$

(h) means for subtracting the quantity $$\frac{ZRc}{r}$$

from the sum obtained from the adding means recited in sub-paragraph (g) to obtain the earth curvature corrected horizontal range Rc in accordance with the expression $$Rc = Ro + (Z+r)f\left(\frac{Ro}{Z+r}\right) - \frac{ZRc}{r}$$

(i) means for dividing the quantity Rc by the quantity $r$, and
(j) means for supplying the quantity $$\frac{Rc}{r}$$

obtained from the dividing means recited in sub-paragraph (i) to the multiplying means recited in sub-paragraph (f) as a feedback quantity.

3. An apparatus for computing the earth curvature corrected height H of a target object above the earth's surface as sensed by a ground-based radar which supplies the uncorrected horizontal range Ro and height Z of the target object, assuming the radius of the earth $r$ to be known, comprising:
(a) means for computing the earth curvature corrected horizontal range Rc of the target object in accordance with the expression $$Rc = Ro + (Z+r)f\left(\frac{Ro}{Z+r}\right) - \frac{ZRc}{r}$$

(b) means for dividing the quantity Rc by the quantity $r$,
(c) means connected to the dividing means recited in sub-paragraph (b) for generating a function $$g\left(\frac{Rc}{r}\right)$$

in accordance with the expression $$g\left(\frac{Rc}{r}\right) = \sec\frac{Rc}{r} - 1$$

(d) means for multiplying the quantity of $r$ by the function $$g\left(\frac{Rc}{r}\right)$$

obtained from the generating means recited in sub-paragraph (c),
(e) means for multiplying the quantity Z by the function $$g\left(\frac{Rc}{r}\right)$$

obtained from the generating means recited in sub-paragraph (c), and
(f) means for adding the quantities Z, $$rg\left(\frac{Rc}{r}\right)$$

and $$Zg\left(\frac{Rc}{r}\right)$$

to obtain the earth curvature corrected height H in accordance with the expression $$H = Z + (Z+r)g\left(\frac{Rc}{r}\right)$$

References Cited by the Examiner
UNITED STATES PATENTS

| 2,444,771 | 7/1948 | Fyler. |
| 3,031,657 | 4/1962 | Trunk _____ 343—5 |
| 3,069,677 | 12/1962 | Bruck et al. _____ 343—11 X |

MALCOLM A. MORRISON, *Primary Examiner.*

I. KESCHNER, *Assistant Examiner.*